(No Model.)
H. KAYSER.
PHOTOGRAPHIC EXCHANGE BOX.
No. 300,478. Patented June 17, 1884.
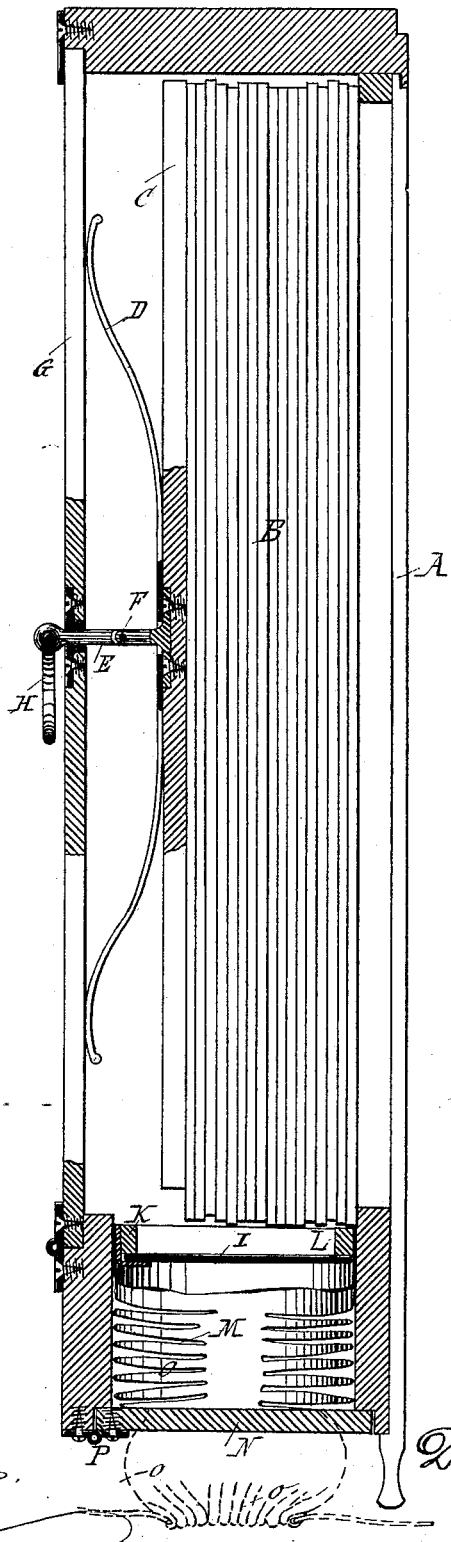
Witnesses:
C. E. Jones
E. Hough
Inventor:
Dr. Heinrich Kayser
By Chas. J. Gooch
his Attorney

United States Patent Office.

HEINRICH KAYSER, OF BERLIN, GERMANY.

PHOTOGRAPHIC EXCHANGE-BOX.

SPECIFICATION forming part of Letters Patent No. 300,478, dated June 17, 1884.

Application filed April 9, 1884. (No model.)

*To all whom it may concern:*

Be it known that I, HEINRICH KAYSER, of the city of Berlin, in the German Empire, have invented certain new and useful Improvements in Photographic Exchange-Boxes for Preventing the Penetration of Light to the Plates, of which the following is a specification.

My invention relates to the construction of photographic exchange-boxes, the object of which is to permit the removal of the exposed plates and to bring a fresh plate in its place in full daylight without being compelled, as heretofore, to slide the box or case into a second case in order to be able to effect the said manipulation—*id est*, the exchange of a fresh plate for the exposed plate. By employing my construction of exchange-boxes I am able to exchange a series of twelve to fifteen plates, when glass plates are employed, and expose them consecutively. The front or foremost plate lies just behind the slide, in suitable position for exposing, and is, after being exposed, withdrawn and placed behind the other plates which have not been exposed. For this purpose one end of the box or case is made to act as a door, so that the exchange can be readily effected by inserting the hand. As, however, the plates must be entirely withdrawn from the box or case, and it is necessary to exclude the light, I employ a sleeve of suitable material capable of excluding the light, which is slid or pushed over the arm of the operator. A suitably-arranged spring or springs presses or press against the movable partition or false bottom of the box or case and hold the series of plates firmly against each other when the outer or foremost plate is to be exposed, whereby a device is provided, so that the pressure of the spring can be removed, and so that the plates rest loosely against each other and can be readily exchanged.

The accompanying drawing represents my improved exchange box or case in section.

A is the slide for closing the box or case A', behind which the plates B, which are to be exposed, are arranged so that they rest against the frame of the box or case. The single plates are separated by an intermediate layer of black or other paper through which the light cannot penetrate, which said layer is loosely attached to the back of each plate. The plates B are continuously pressed against the bearing-surface of the frame by means of a suitable spring acting on the movable or false bottom, so that the front or foremost plate is kept in focus.

I represents the side of the box or case A', which is formed to act as a door, which said door lies snugly against the two ledges or rails K and L, and is movably connected with the box or case by means of a piece or strip of canvas, leather, or other suitable material, which is glued or otherwise attached to the box or case frame and clamped tight by means of the ledge K; or a suitable joint, hinge, or hinges can be employed for the like purpose. The ledges K L serve also to hold the sleeve O, of suitable fabric, which will exclude the light, which said sleeve can be folded up and carried in the space M of the box or case between the door I and the other door, N, to the exchange box or case, which said door is provided with suitable hinge or hinges, P. The requisite play for enabling the plates to be readily exchanged is attained by drawing back the false bottom or partition C toward the bottom of the said box or case, thereby compressing the spring or springs D, which can be effected by connecting a rod or spindle, E, to the false bottom C, which said rod E is provided with a suitable knuckle or other joint, F, and reaches through the bottom G of the box or case. The outer end of the rod E is provided with a ring, H, so that by pulling this ring outward the joint F is drawn to the outside of the box or case A', compressed, and space or play for the exchange of the plates in the said exchange-box attained, whereby the false bottom C can be retained in the position mentioned above by simply giving the outer end of the rod E a partial revolution of forty-five degrees around the knuckle or other joint, so that the said outer end of the rod E lies flush or about flush with the bottom or back of the box or case. As soon as the exchange of the plates has been effected the rod E is returned to its original straight position by means of the ring H, whereupon the plates are again firmly compressed by the intervention of the false bottom C and the spring D.

My improved exchange box or case for photographic plates possesses, in comparison with the ordinary exchange-boxes, not only the advantage of the enormous reduction in weight, but also of being able to employ plates of various sizes, for which purpose it is only necessary to insert a suitable adjustable or readily removable ledge to lessen the length or width of the said box or case, but so as to leave the space next the door I free.

My said improved box or case can be employed for the ordinary dry plates, but is specially adapted for dry plates in which the emulsion is not attached to glass, but to a thin flexible plate of suitable material, such as have already been the subject of various patents. The photographic exchange-box, as shown in the accompanying drawing, can contain about fifty of such said flexible plates, and, when such said plates are about eighteen centimeters wide and twenty-four centimeters long, weighs, inclusive of the plates, only about four pounds. The back or bottom of the case is also provided with suitable hinges to facilitate the introduction of the plates in the box. By the employment of the sleeve O of a fabric impervious to light, the use of an additional case or box is rendered unnecessary.

Having now described and ascertained the nature of my said invention, what I claim is—

1. A photographic exchange box or case for securing the changing of the plates in full daylight, consisting of a box, A', having a hinged bottom or back, G, slide A, movable false bottom or partition C, spring or springs D, adapted to press said bottom or partition forward, and the door I and a sleeve, O, composed of a fabric impervious to light, substantially as and for the purpose set forth.

2. The movable false bottom C, provided with a rod, E, having a knuckle or other joint, F, at about the center of its length, and a ring, H, or its equivalent, at the outer end, spring or springs D, and the sleeve O, of impenetrable material or fabric, substantially as and for the purpose set forth.

3. The combination of the box or case A', having doors N and I, and the sleeve O, of light-excluding fabric, substantially as and for the purpose set forth.

In witness whereof I have hereunto signed my name in the presence of two subscribing witnesses.

HEINRICH KAYSER.

Witnesses:
E. STUTZER,
ANTHONY STEFFEN.